May 17, 1932.  F. MILLER  1,858,785
TRAILER COUPLING
Filed Jan. 6, 1931   2 Sheets-Sheet 1
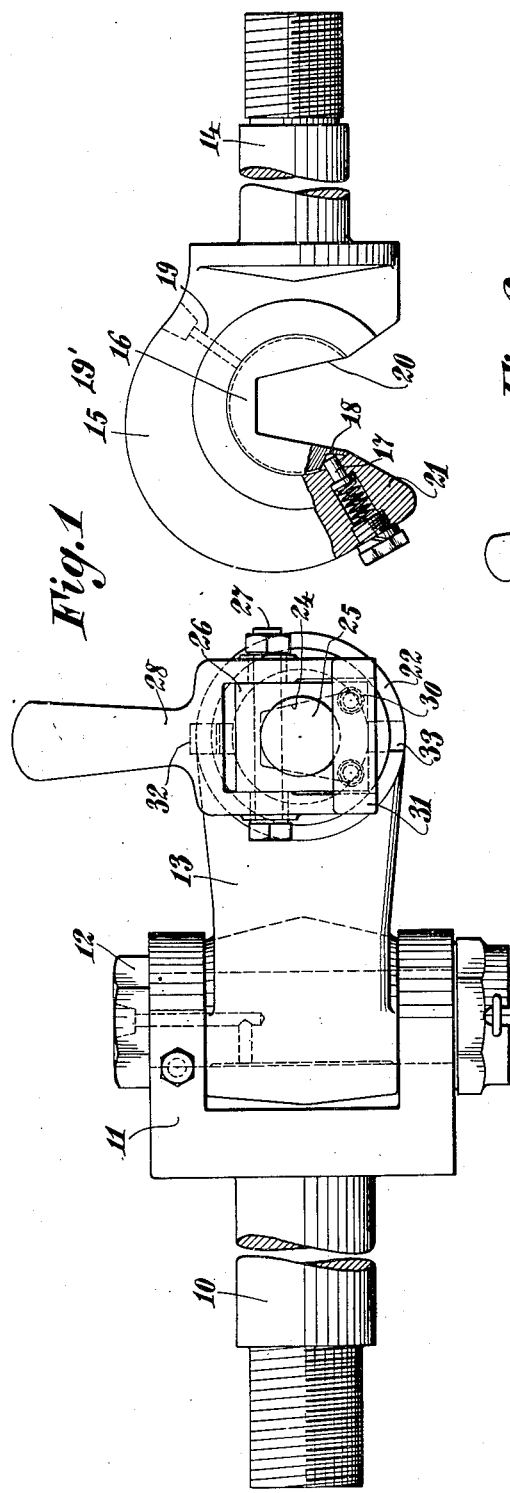
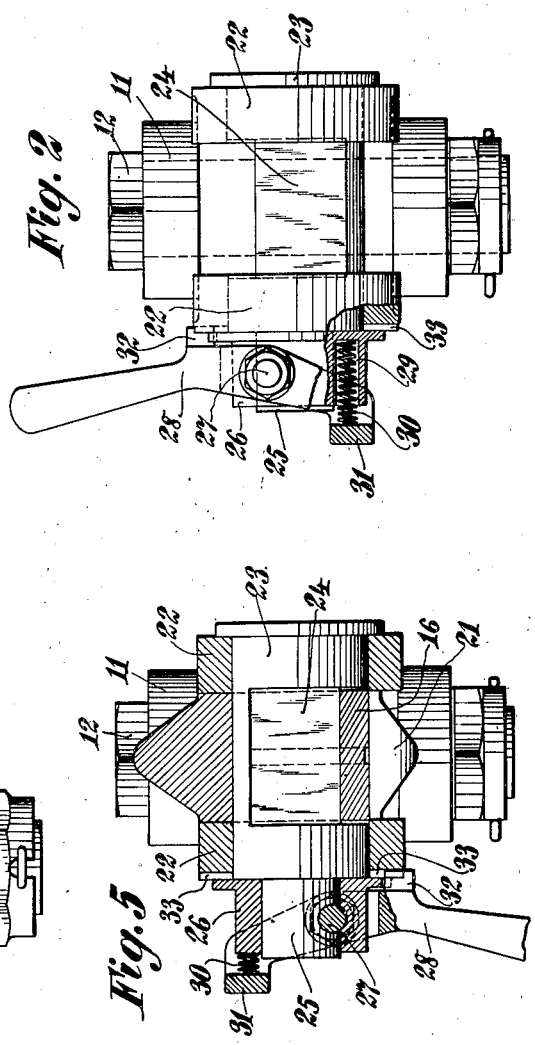
INVENTOR
*Ferdinand Miller,*
BY
Redding, Greeley, O'Shea & Campbell
HIS ATTORNEYS May 17, 1932.  F. MILLER  1,858,785
TRAILER COUPLING
Filed Jan. 6, 1931  2 Sheets-Sheet 2

INVENTOR
Ferdinand Miller,
BY Redding, Greeley, O'Shea & Campbell
HIS ATTORNEYS

Patented May 17, 1932

1,858,785

UNITED STATES PATENT OFFICE

FERDINAND MILLER, OF ELIZABETH, NEW JERSEY, ASSIGNOR TO INTERNATIONAL MOTOR COMPANY, OF NEW YORK, N. Y., A CORPORATION OF DELAWARE

TRAILER COUPLING

Application filed January 6, 1931. Serial No. 506,865.

The present invention relates to coupling mechanism for vehicles and embodies, more specifically, an improved coupling adapted to connect a trailer to a tractor with provision for full universal action therebetween. The invention is further concerned with a coupling of the above character, wherein a positive lock is provided for securing the coupling elements in coupled relationship, the tractor and trailer being positively coupled in such manner that "snaking" is prevented during operation.

In existing constructions of this character, lost motion exists which causes the trailing element to sway and swerve when in motion and traveling above a predetermined speed. This condition, together with the "bucking" of the trailer upon changes in speed of the tractor is highly objectionable and difficult to prevent. Previous attempts to overcome these disadvantages have either sacrificed simplicity of construction and ease of coupling operation for a device wherein lost motion does not exist, or have failed to eliminate such lost motion and the consequent evils thereof.

An object of the present invention, accordingly, is to provide a coupling for trailer drawbars, wherein the elements are simple in construction and easily operated to couple or disengage the tractor and trailer.

A further object of the invention is to provide a coupling mechanism of the above character wherein a universal action is provided between the tractor and trailer at the same time affording a positive locking mechanism for the coupler.

A further object of the invention is to provide a coupling mechanism of the above character wherein adequate provision is made for lubricating the bearing surfaces thereof.

A further object of the invention is to provide a coupling mechanism of the above character, wherein all lost motion is eliminated.

Further objects, not specifically enumerated above, will be apparent as the invention is described in greater detail in connection with the accompanying drawings, wherein:

Figure 1 is a plan view showing a coupling mechanism constructed in accordance with the present invention, the right and left hand elements thereof including the coupler hook and the male coupler member and lock, respectively.

Figure 2 is a view in end elevation, showing the left hand or male coupling element of the mechanism of Figure 1.

Figure 5 is a view in section, taken on line 5—5 of Figure 3, and looking in the direction of the arrows.

Figure 3:
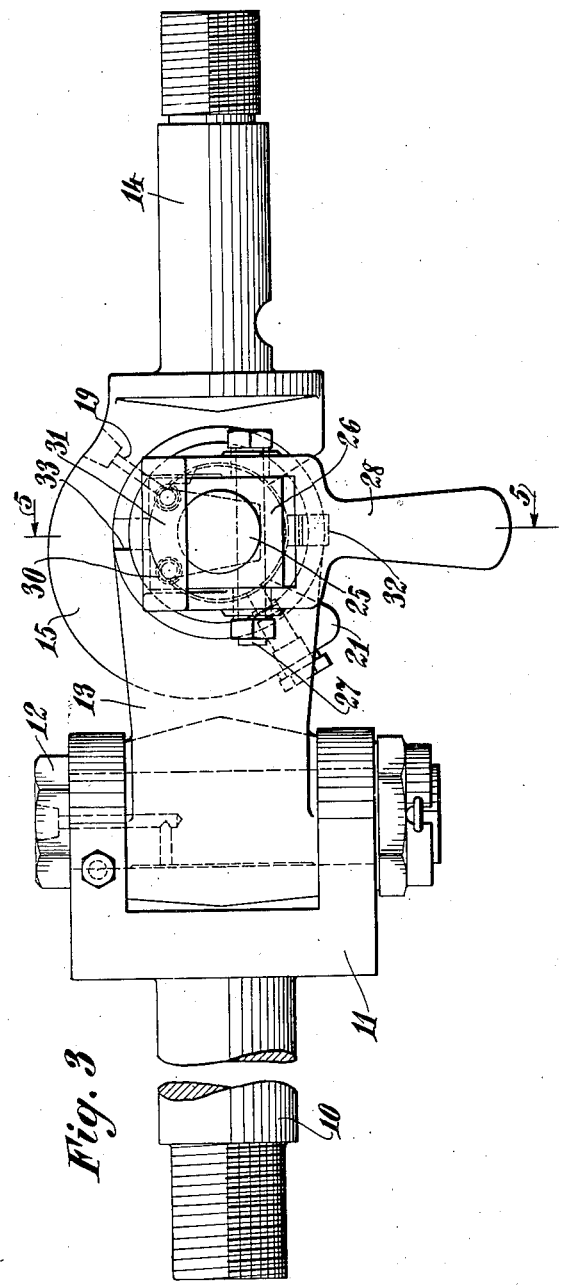
Figure 3 is a view similar to Figure 1, showing the elements coupled and locked in position.
Figure 4:
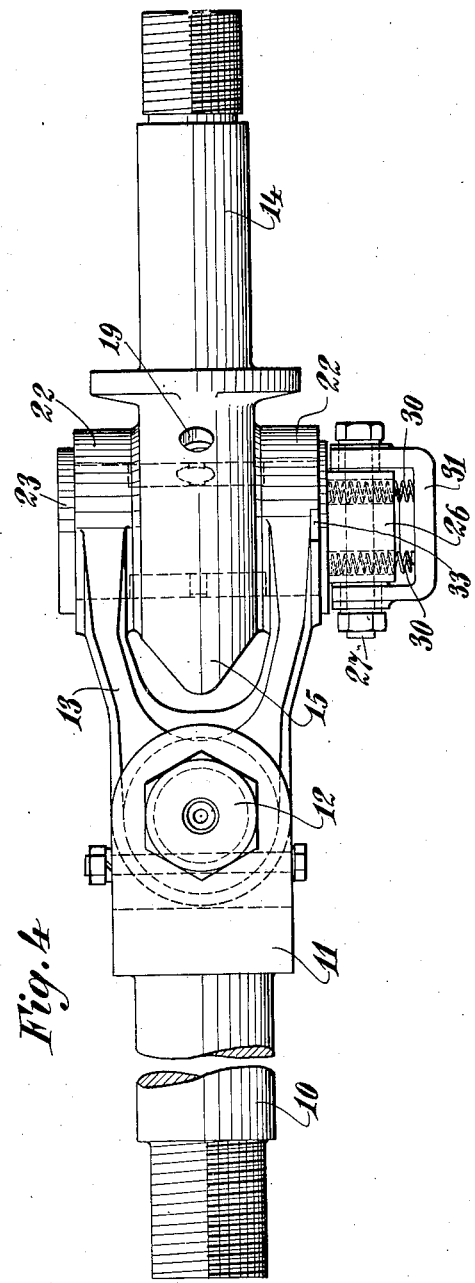
Figure 4 is a view in side elevation, showing the elements in coupled position.

Referring to the above drawings, a tractor fitting is shown at 10 having a bifurcated or forked portion 11. A pin 12 is journaled in the bifurcation and journals a coupling member 13. Upon the trailer a drawbar fitting 14 is mounted, this fitting being formed with a hook 15 within which a pin or bushing 16 is journaled. Spring pressed detent 17 engages a recess 18 in the pin 16 to hold the same normally in its disengaging position. A suitable oil or lubrication duct 19 is formed in the hook and communicates with a groove 19' to lubricate the bearing surface between the pin 16 and the hook 15. The groove 19' further serves to receive detent 17 to prevent bushing 16 from being axially displaced when turned from the position shown in Fig. 1. A notch 20 is formed in the pin 16 and extends axially thereof throughout its length. The outer edges of the notch terminate adjacent flared extensions 21 on the jaws of the hook 15, thus serving to guide the male coupling member into the recess or notch 20.

Upon the fitting 13, bifurcated extensions 22 are formed. A pin 23 is journaled in these extensions and on the portions between such extensions the pin is cut away as at 24 to conform to the profile of the notch or recess 20.

An extension or stub shaft 25 is formed on the pin and receives a bushing 26 through which a pivot pin 27 extends. This pivot pin serves not only to pivot a latch 28, but also serves as a key or locking member to secure the bushing 26 upon the extension 25. Within the bushing 26, a recess 29 is formed for receiving a spring 30. A U-shaped extension 31 is formed on the latch member 28 and is engaged by the spring 30 to normally urge the latch in a clockwise direction, as viewed in Figure 2. A latch finger 32 is formed on the latch and is adapted to engage aligned grooves 33 spaced upon opposite sides of one of the bifurcated portions 22, as clearly shown in Figures 2 and 5. When the trailer and tractor are to be coupled, the elements are in the relative positions shown in Figure 1. The hook 15 is inserted between the bifurcated fitting 13 and the pin 23 engages the recess 20 in the pin 16. Latch 28 is lifted to disengage finger 32 from the corresponding groove 33 and then rotated through 180° until the finger 32 finds the opposite groove 33. As clearly shown in Figure 3, the pins 23 and 16 are positively interengaged and are positively locked in such engaged position by means of the latch 28. No lost motion is permitted by the coupling elements and thus any tendency to buck or snake is entirely eliminated. There is a universal action provided as well as a positive lock and the construction is such that coupling and uncoupling may be accomplished through extremely simple operations.

While the invention has been described with specific reference to the accompanying drawings, it is not to be limited, save as defined in the appended claims.

I claim as my invention:

1. A tractor element, a trailer element, a bifurcated extension upon one of the elements, a hook upon the other element, a bifurcated link journaled in the first bifurcation, a pin journaled in the link bifurcation, interengaging means on the pin and hook, and means to lock the interengaging means in engaged position.

2. A tractor element, a trailer element, a bifurcated extension upon one of the elements, a hook upon the other element, a bifurcated link journaled in the first bifurcation, a pin journaled in the link bifurcation, a pin journaled in the hook, and interengaging portions formed in the pins.

3. A tractor element, a trailer element, a bifurcated extension upon one of the elements, a hook upon the other element, a bifurcated link journaled in the first bifurcation, a pin journaled in the link bifurcation, a pin journaled in the hook, and interengaging portions formed in the pins whereby the pins may be rotated about a common axis when interengaged.

4. A tractor element, a trailer element, a bifurcated extension upon one of the elements, a hook upon the other element, a bifurcated link journaled in the first bifurcation, a pin journaled in the link bifurcation, a pin journaled in the hook and formed with a recess normally open to the hook opening, said first pin being formed with a section adapted to engage the recess.

5. A tractor element, a trailer element, a bifurcated extension upon one of the elements, a hook upon the other element, a bifurcated link journaled in the first bifurcation, a pin journaled in the link bifurcation, a pin journaled in the hook and formed with a recess normally open to the hook opening, said first pin being formed with a section adapted to engage the recess, and means to rotate the pins upon a common axis when interengaged.

6. A tractor element, a trailer element, a bifurcated extension upon one of the elements, a hook upon the other element, a bifurcated link journaled in the first bifurcation, a pin journaled in the link bifurcation, a pin journaled in the hook and formed with a recess normally open to the hook opening, means to retain the pin with the recess open to the hook opening, said first pin being formed with a section adapted to engage the recess.

7. A tractor element, a trailer element, a bifurcated extension upon one of the elements, a hook upon the other element, a bifurcated link journaled in the first bifurcation, a pin journaled in the link bifurcation, a pin journaled in the hook and formed with a recess normally open to the hook opening, said first pin being formed with a section adapted to engage the recess, means to rotate the pins upon a common axis when interengaged, and means to lock the rotating means in an engaging position.

8. A tractor element, a trailer element, a bifurcated extension upon one of the elements, a hook upon the other element a bifurcated link journaled in the first bifurcation, a pin journaled in the link bifurcation, a pin journaled in the hook and formed with a recess normally open to the hook opening, said first pin being formed with a section adapted to engage the recess, a stub shaft on the first pin, a collar on the stub shaft, a pivot pin on the collar and securing the collar to the stub shaft, a latch pivoted on the pivot pin, said collar being formed with spaced recesses to receive the latch, and a spring between the collar and latch to urge the latter normally into engaging position.

This specification signed this 22 day of December, A. D. 1930.

FERDINAND MILLER.